United States Patent [19]

Yokouchi

[11] Patent Number: 4,958,275
[45] Date of Patent: Sep. 18, 1990

[54] INSTRUCTION DECODER FOR A VARIABLE BYTE PROCESSOR

[75] Inventor: Hiroshi Yokouchi, Tokyo, Japan

[73] Assignee: Oki Electric Industry Co., Ltd., Tokyo, Japan

[21] Appl. No.: 141,234

[22] Filed: Jan. 6, 1988

[30] Foreign Application Priority Data

Jan. 12, 1987 [JP] Japan .................................. 62-3305

[51] Int. Cl.$^5$ .............................................. G06F 9/32
[52] U.S. Cl. .................................... 364/200; 364/262; 364/262.4; 364/244.9; 364/244; 364/251.3; 364/251
[58] Field of Search ... 364/200 MS File, 900 MS File

[56] References Cited

U.S. PATENT DOCUMENTS

| | | | |
|---|---|---|---|
| 3,466,613 | 9/1969 | Schlaeppi | 364/200 |
| 3,665,411 | 5/1972 | O'Connor | 364/200 |
| 3,771,141 | 11/1973 | Culler | 364/200 |
| 4,037,213 | 7/1977 | Atkins et al. | 364/200 |
| 4,118,776 | 10/1978 | Isomura | 364/200 |
| 4,202,035 | 5/1980 | Lane | 364/200 |
| 4,306,287 | 12/1981 | Huang | 364/200 |

FOREIGN PATENT DOCUMENTS 043358 3/1963 United Kingdom .
2187577 A 9/1987 United Kingdom .

OTHER PUBLICATIONS

"A 2-μm CMOS 8-MIPS Digital Signal Processor with Parallel Processing Capability"; IEEE Journal of Solid-State Circuits, vol. SC-21, No. 5, Oct., 1986; pp. 750-765.

Primary Examiner—Gareth D. Shaw
Assistant Examiner—Kevin A. Kriess
Attorney, Agent, or Firm—Wenderoth, Lind & Ponack

[57] ABSTRACT

An instruction decoder, for a variable byte processor, is capable of making the variable byte processor operate at a high processing speed and high byte efficiency. The instruction decoder includes an instruction register which stores instructions applied to an internal data bus, a first instruction decoding unit which provides a consecutive instruction execution mode signal specifying the repetitive execution of the instruction read from the instruction register for different operands stored at different addresses, a consecutive instruction execution cycle monitoring unit which counts the number of execution cycles of the instruction and provides a signal indicating the completion of the repetitive execution of the instruction, register/counters which count the number of execution cycles and provide operands of different addresses every time an execution cycle is completed, a second instruction decoding unit which sequentially specifies data stored at different operand addresses in response to the output signals of the register/counters, and a gate which inhibits the instruction register from reading a new instruction until the instruction is repeated by the specified number of execution cycles.

2 Claims, 8 Drawing Sheets

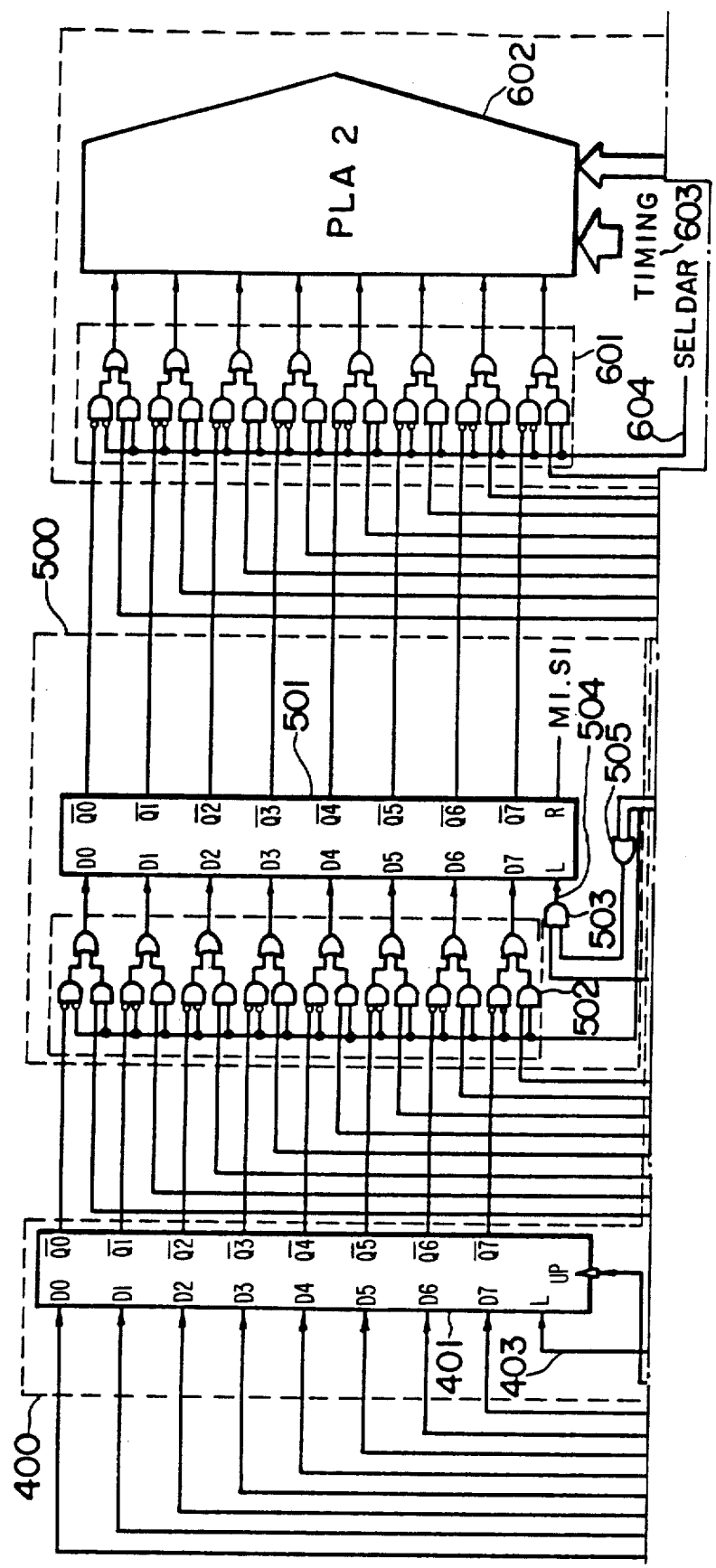

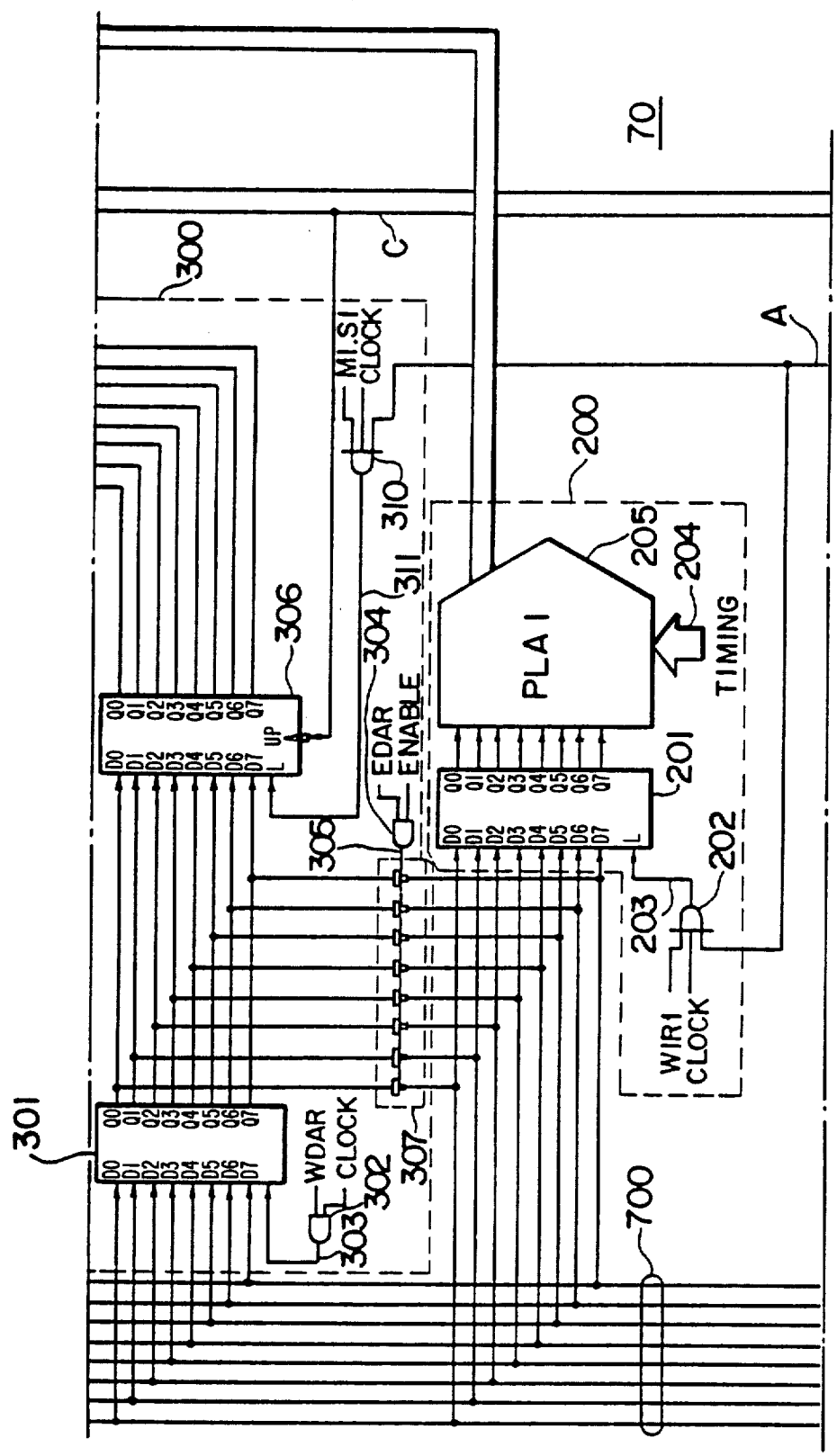

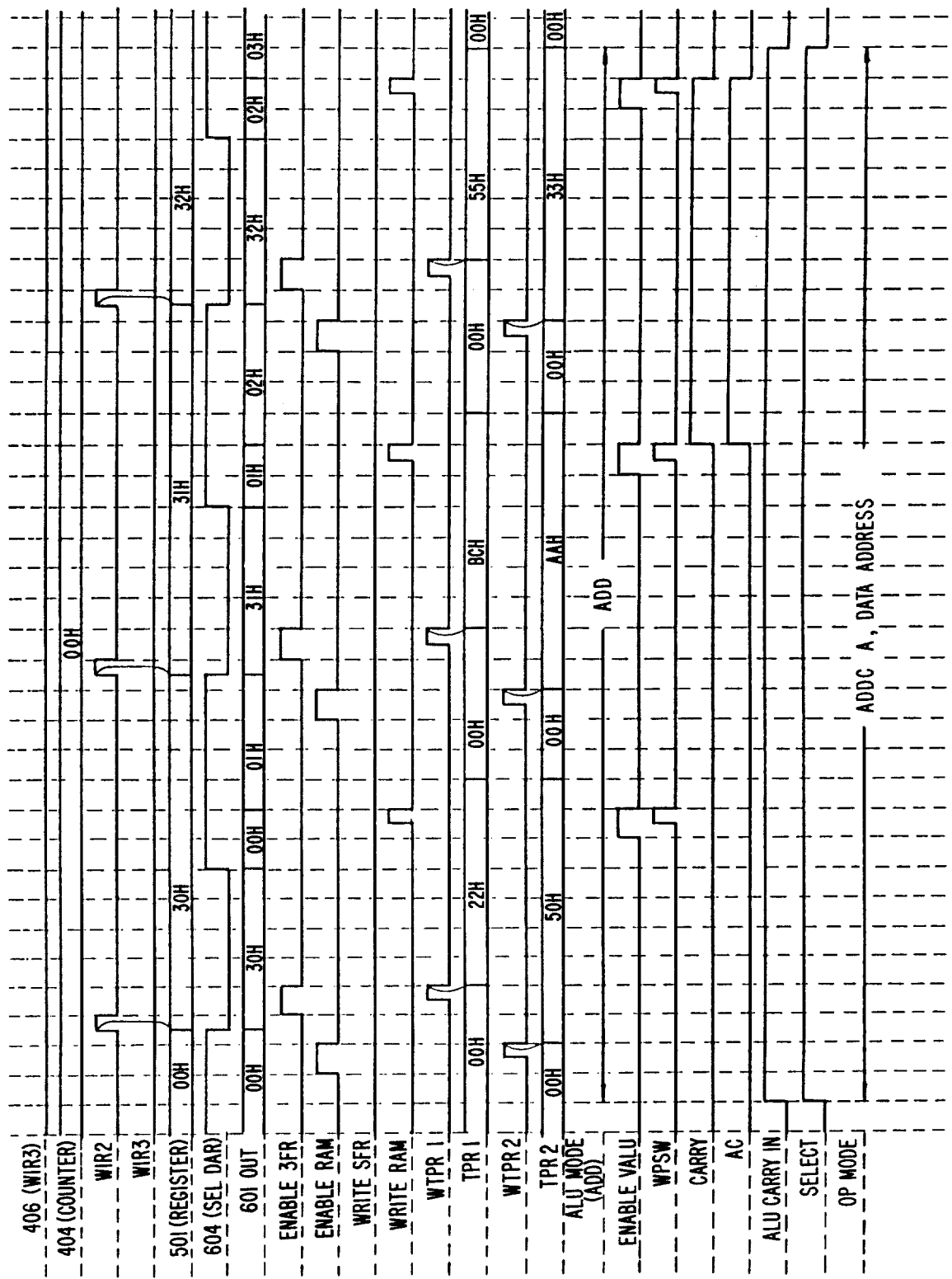

INSTRUCTION DECODER FOR A VARIABLE BYTE PROCESSOR

BACKGROUND OF THE INVENTION

1. Field of the Invention:

The present invention relates to an instruction decoder for a variable byte processor and, more particularly, to an instruction decoder for a processor for which an instruction contains a first byte for representing an operation code, and the second and subsequent bytes for representing operand addresses.

2. Description of the Prior Art:

In a conventional central processing unit (hereinafter abbreviated to "CPU"), an instruction which contains a first byte for representing an operation code, and second and subsequent bytes for representing operand addresses, is read into and decoded suquentially by an instruction decoder to execute a program operation. Intel's CPU 8051 uses, for example, an instruction "ADDC A, data address", in which "ADDC " (addition with carry) is an operation code, "A" is an operand address, and "data address" is another operand address. In this instruction, "A" is a fixed operand address exclusively specifying an accumulator, while "data address" is variable and specifies internal random access memories (RAMs) or a plurality of special registers.

In such a conventional CPU, since one of the operand addresses, for example, the operand address "A", is fixed, a plurality of instructions are provided in combination to operate in accordance with a plurality of bytes. Accordingly, a long program including many steps is necessary thereby resulting in a long processing time. Also, the many instructions for byte processing occupy many addresses in the read-only memory, thus degrading byte efficiency.

SUMMARY OF THE INVENTION

Accordingly, it is an object of the present invention to provide an instruction decoder used in a CPU capable of solving the foregoing problems and capable of making the associated CPU operate at a high byte efficiency.

To achieve the object of the invention, the present invention provides an instruction decoder comprising an instruction register connected to a data bus to read instructions, a first instruction decoding unit for controlling the general operation of a CPU by reading instructions from the instruction register, which provides a consecutive execution mode signal upon the reception of a consecutive execution instruction specifying the sequential repetition of an operation for operands at different operand addresses in the CPU, a consecutive execution monitoring unit which is set for the number of cycles of the operation, counts the number of cycles of the operation, and provides a count completion signal upon the coincidence of the count of the number of the cycles of the operation with the set number of cycles of the operation, counters which count the number of cycles of the operation and provide different addresses sequentially, a second instruction decoding unit which specifies the data of the different addresses sequentially every time the output of the counters is applied thereto, and an instruction read inhibit means which inhibits the instruction register from reading a new instruction from the data bus during a period from a moment when the consecutive execution mode signal is provided to a moment when the count completion signal is provided.

When the same operation is to be repeated, an instruction specifying the repetition of the operation is applied through the data bus and the instruction register to the first instruction decoder. When the first instruction decoder provides a consecutive execution mode signal, the operation code is held in the instruction register. The contents of the counter connected to the input of the second instruction decoder changes sequentially every time the operation is executed. Consequently, the second instruction decoder specifies different operand addresses (an internal data memory and a special register) sequentially. Upon the completion of repetition of the operation by the set number of cycles, the consecutive execution monitoring unit generates a count completion signal, and then the instruction register reads a new instruction.

The above and other objects, features and advantages of the present invention will become more apparent from the following description taken in conjunction with the accompanying drawings.

DESCRIPTION OF THE DRAWINGS

FIGS. 4, 4A and 4B are time charts explaining the operation of the CPU of FIG. 1.

DESCRIPTION OF THE PREFERRED EMBODIMENT

Figure 1:
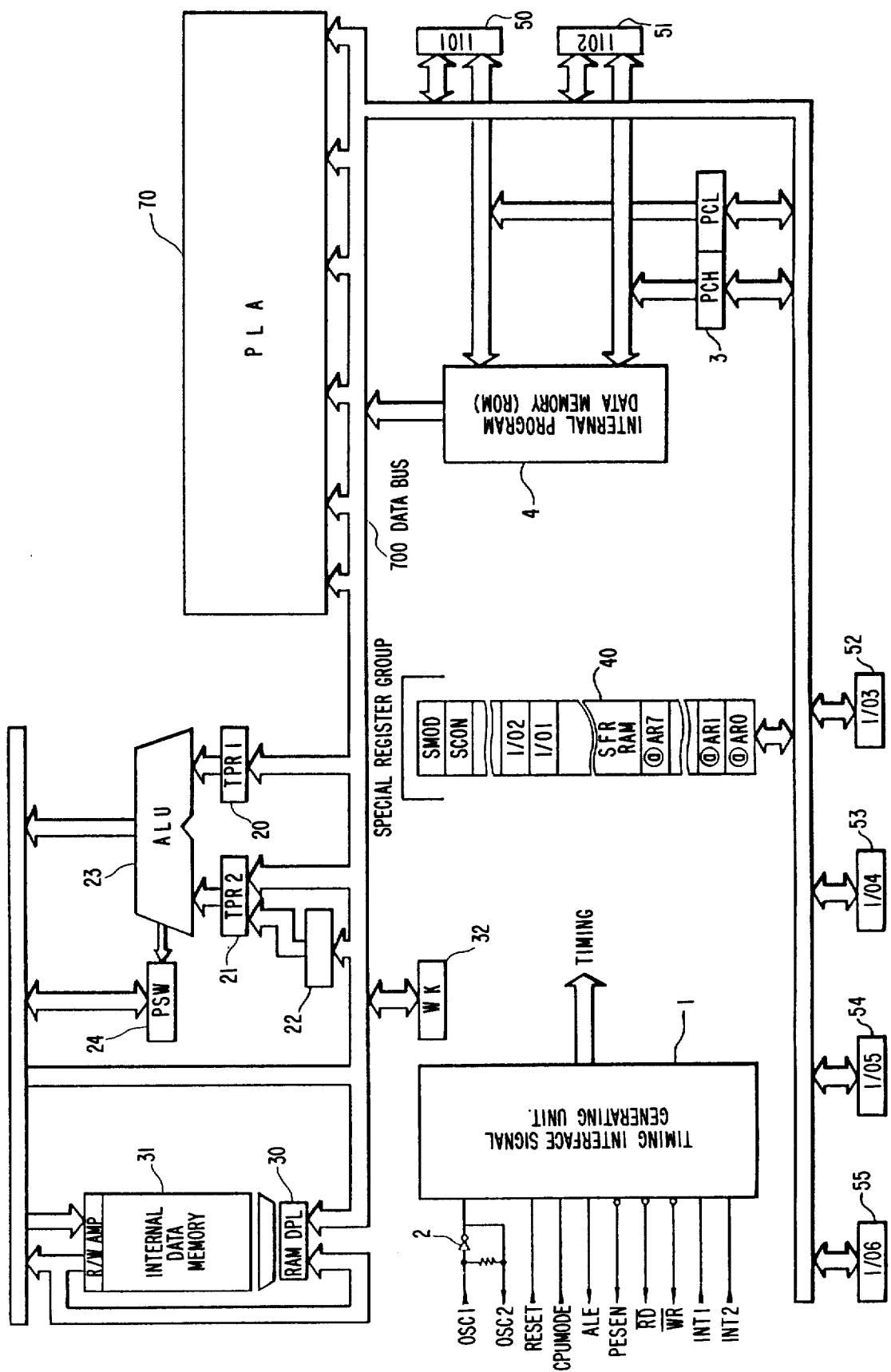
FIG. 1 is a block diagram of a CPU incorporating an instruction decoder, in a preferred embodiment, according to the present invention.

Referring to FIG. 1 showing a microprocessor (CPU) incorporating an instruction decoder according to the present invention having an improved PLA, a timing interface signal generating unit 1 generates basic timing signals for controlling various timing operations of the microprocessor, and interface signals for controlling the data communication between the microprocessor and the peripheral equipments. An inverter oscillator 2 generates clocks signals to the unit 1. A program counter 3 specifies a program instruction and immediate data. An internal program data memory (ROM) 4 stores program instructions and immediate data. Temporary registers 20 and 21 store data temporarily during the execution of an instruction. A decoder 22 necessary for implementing instructions generates constants on the basis of program data. An arithmetic and logic unit (hereinafter abbreviated to "ALU") 23 processes addition (ADD), inclusive OR (OR), exclusive OR (EOR) and/or logical multiply (ADD) operations of the contents in the temporary registers 20 and 21. A register 24 stores flags processed by the ALU 23. An internal data memory (RAM) 31 stores processed data. A register 30 stores the specified address data of the internal data memory 31. A working register 32 stores data temporarily during the implementation of an instruction. A special register group 40 has many functions and includes indirect registers, data memories (RAMs), I/O ports, timer counters, timer counter control registers, interruption control registers and interruption flags. I/O ports 50 and 51 are used for sending out processed data, receiving data from external equipments, and sending out the output of the program counter for specifying an external program data and receiving external program data in an external ROM mode. I/O ports 52 to 55 are used for sending out processed data and receiving external data. Data processed in the CPU is transmitted through internal buses.

Figure 2B:
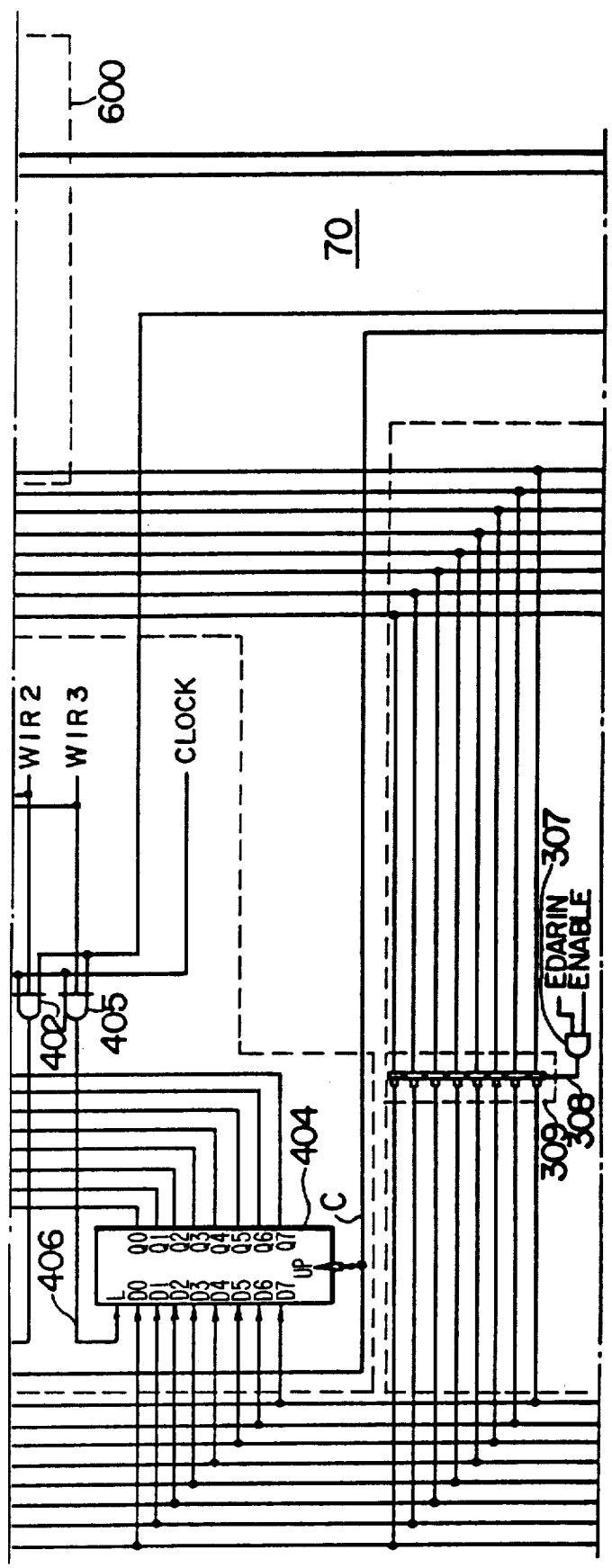
FIGS. 2, 2A and 2B are block diagrams of an instruction decoding and control included in the CPU of FIG. 1.
Figure 2D:
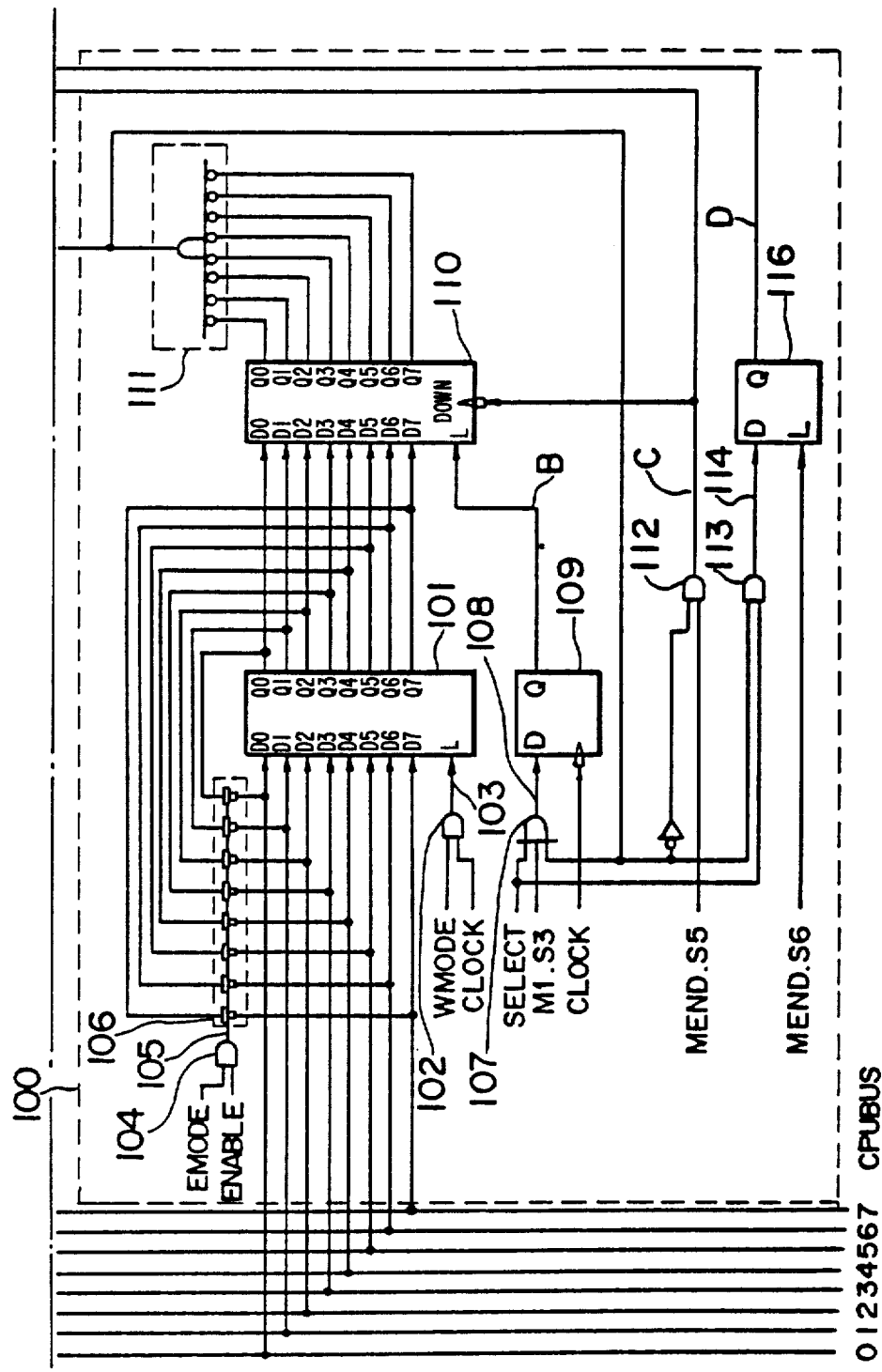

FIGS. 2, 2A and 2B show an instruction decoding and control unit 70 which generates control signals for controlling the general operation of the CPU. The control signals include signals for controlling the internal data memory (RAM) and the special register (@ARO, I/O, SMOD).

A consecutive instruction execution cycle monitoring unit 100 counts and controls the number of instruction execution cycles in a consecutive execution mode. A register 101 stores consecutive execution frequency setting data applied to a data bus 700, when a gate 102 provides an output signal 103. A gate 106 provides the consecutive execution frequency setting data stored in the register 101 to the data bus 700, when a gate 104 provides an output signal 105. A flip-flop 109 receives a signal 108 from a gate 107 at the trailing edge of a clock signal to provide a write signal B to a register/counter 110. Upon the reception of the write signal B, the register counter 110 stores the consecutive execution number setting data in the register 101. The register counter 110 counts down the number of cycles of consecutive execution when a gate 112 provides a signal C. A gate 111 for detecting the completion of the consecutive execution provides a count completion signal A, when the contents of the counter 110 becomes 00H. The count completion signal A is applied as a selection signal to gates 107, 112, 113, 202 and 310. A flip-flop 116, when a MEND S6 signal is applied thereto, receives a signal 114 from a gate 113 and then gives a write control signal D to registers 401 and 404.

An instruction decoding unit 200 decodes an instruction code and provides signals to control the general operation of the CPU. An instruction register 201 stores program instruction data. When a gate 202 provides an output signal 203, the instruction register 201 reads in and stores instruction data applied to the data bus 700. A first PLA 205 decodes the contents of the instruction register 201 and generates a control signal for controlling the general operation of the CPU through an AND operation using a timing signal 204.

A register unit 300 stores data for specifying operand addresses, namely, the internal data memory (RAM) and the special register (@ARO, I/O, SMOD). The register unit 300 specifies the internal data memory and the special register by instruction mnemonics. A register 301 stores data applied to the data bus 700 for specifying the internal data memory (RAM) and the special register(@ARO, I/O, SMOD) when a gate 304 provides a signal 305. A gate 307 applies the data for specifying the internal data memory (RAM) and the special registers (@ARO, I/O, SMOD) stored in the register 301 to the data bus 700 when a gate 304 provides an output signal 305. A register/counter 306 stores the data for specifying the internal data memory (RAM) and the special register (@ARO, I/O, SMOD) stored in the register 301, when an instruction mnemonic mode is selected and a gate 310 provides an output signal 311. The register/counter 306 carries out its increments operation every time a signal C is provided. The data in the register/counter 306 specifies the internal data memory (RAM) and the special register. The data for specifying the internal data memory (RAM) and the special register (@ARO, I/O, SMOD) in the register 306 is applied to the data bus 700 through a gate 309, when the gate 307 provides a signal 308.

A memory unit 400 stores data for specifying the internal data memory (RAM) and the special register (@ARO, I/O, SMOD). The memory unit 400 stores data in the second and third bytes succeeding an instruction code. A register/counter 401 stores data for specifying the internal data memory (RAM) and the special register (@ARO, I/O, SMOD) in the second byte succeeding an instruction code and applied to the data bus 700, when a gate 402 provides a signal 403. The register/counter 401 also serves as an up-counter which increases its count by one every time the signal C is provided.

A register/counter 404 specifies the internal data memory (RAM) and the special register (@ARO, I/O, SMOD). The register/counter 404 stores data on the data bus 700, that is, the data in the third bytes succeeding an instruction code, when a gate 405 provides a signal 406. The register/counter 404 serves also as an up-counter which increases its count by one every time the signal C is provided.

In repeating an instruction (operation between data in arbitrary regions) represented by instruction mnemonics capable of addressing two operand addresses, such as ADDC data address 1 and data address 2, the register/counter 404 is set for the data address 2 and increases its count by one every time the instruction is executed.

A memory unit 500 stores data for specifying the internal data memory (RAM) and the special register (@ARO, I/O, SMOD) stored in the register/counters 401 and 404, and selected data. A signal WIR3 makes a gate 502 select the data stored in register/counters 401 and 404. When a gate 503 provides a signal 504, a register 501 stores data selected by a gate 502 among the data for specifying the internal data memory (RAM) and the special register (@ARO, I/O, SMOD) stored in the register/counters 401 and 404.

A decoding unit 600 generates signals (R/W) for controlling the internal data memory (RAM) and the special register (@ARO, I/O, SMOD). A selecting circuit 601 selects the contents of the counter 306 or the data for specifying the internal data memory (RAM) and the special register (@ARO, I/O, SMOD) according to a selection signal 604 and transmits the selected data to a second PLA 602.

The second PLA 602 decodes data transferred from the register 501 and the counter 306 and generates control signals for operating the internal data memory (RAM) and the special register (@ARO, I/O, SMOD). The second PLA decodes data stored in the register 501 and the counter 306, namely, data selected by the selecting circuit 601 among those for specifying the internal data memory (RAM) and the special register (@ARO, I/O, SMOD), provides the logical product (AND) of the decoded data and a timing signal 603, and generates control signals for controlling the internal data memory (RAM) and the special register (@ARO, I/O, SMOD).

Figure 3:
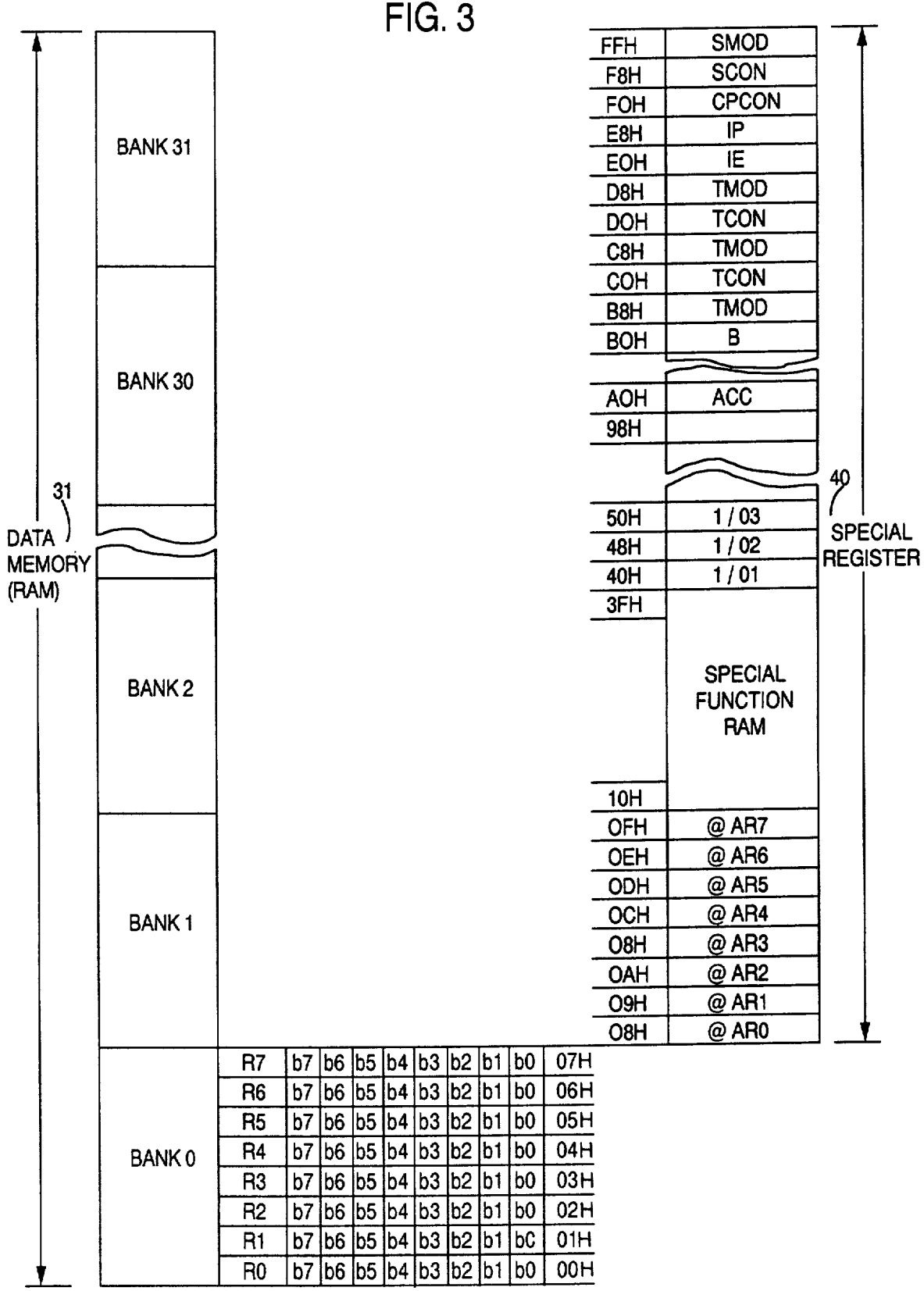
FIG. 3 is an illustration of the data arrangement of an internal data memory (RAM) and a special register included in the CPU of FIG. 1.

The respective constitutions of the internal data memory (RAM) and the special register (@ARO, I/O, SMOD) will be described hereinafter with reference to FIG. 3.

The internal data memory (RAM) 31 of the CPU is divided into banks. Each bank comprises eight registers R0 to R7, which are specified by data addresses 00H to 07H, respectively. The RAMDPL register 30 (FIG. 1) specifies the banks of the internal data memory (RAM). The areas of the special register (@AR0, I/O, SMOD) 40 is assigned to data addresses 08H to FFH. The areas assigned to data addresses 08H to 0FH, namely, areas @AR0 to @AR7, among the areas of the special register 40 are indirect data address specifying registers. When the areas 08H to 0FH are specified, the contents of the areas @AR0 to @AR7 specify the internal data memory and the special register 40. Areas 10H to 3FH are data memories (RAMs) within the special register. Areas 40H to FFH are special function registers, such as I/O ports and timer counters, which are assigned to data addresses.

Figure 4A:
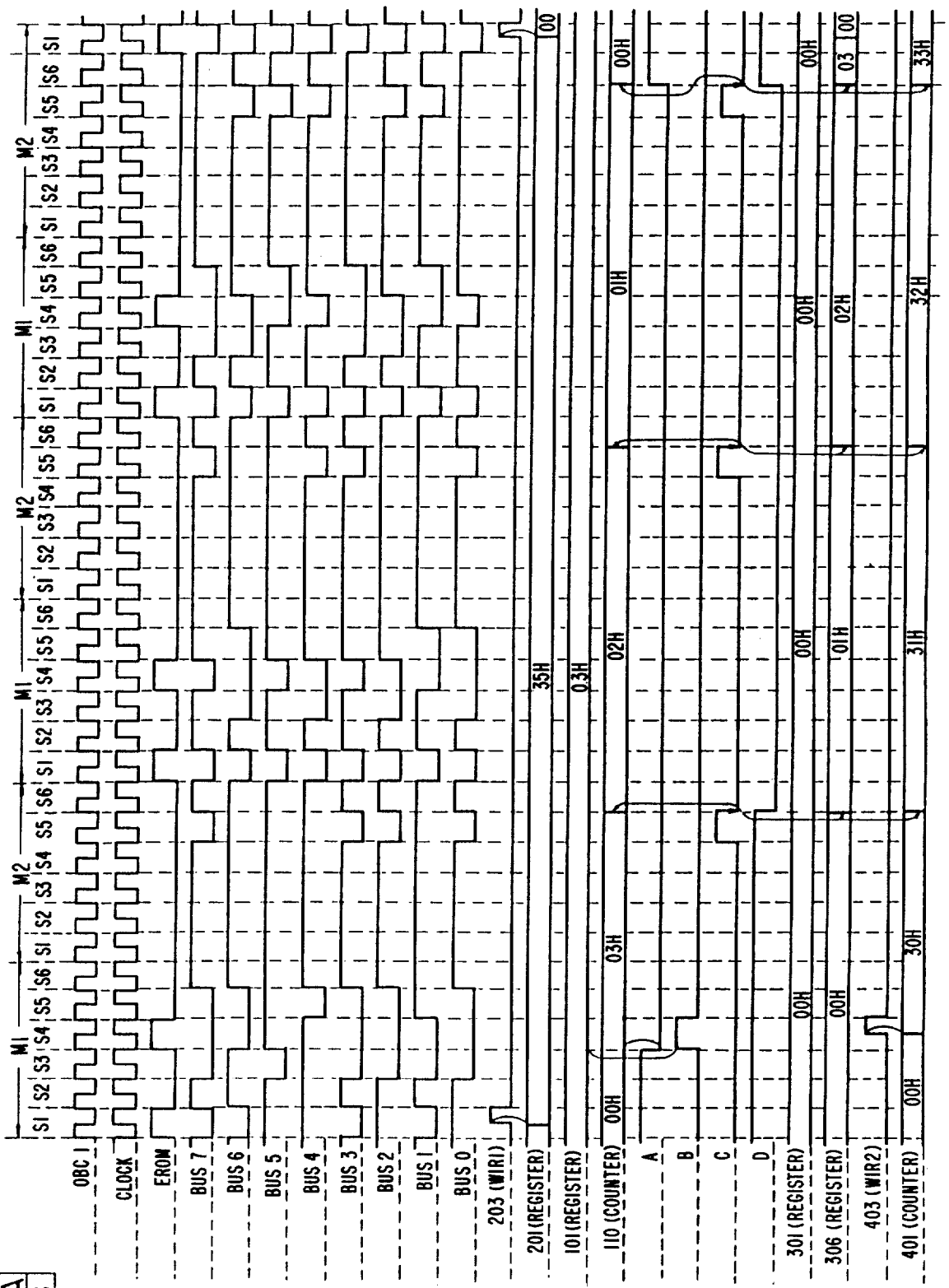

The manner of operation of the instruction decoder thus constructed will be described with reference to FIGS. 4, 4A and 4B.

In FIG. 4, a signal OSC1 is a clock signal generated by the internal oscillator of the CPU, and a signal CLOCK is a synchronizing clock for controlling the timing of writing data in the internal data register and the special register of the CPU. BUS7 to BUS0 are signals applied to the data bus 700. A signal 203 (WIR1) corresponds to the signal 203 (FIG. 2). An indication 201 (REGISTER) indicates the mode of the instruction register 201 (FIG. 2). An indication 101 (REGISTER) indicates the mode of the register 101 (FIG. 2) for setting the number of execution cycles of an instruction. An indication 110 (COUNTER) indicates the mode of the counter 110 for counting the number of execution cycles. Signals A, B, C and D correspond to the signals A, B, C and D in FIG. 2. An indication 301 (REGISTER) indicates the mode of the register 301 (FIG. 2). An indication 306 (COUNTER) indicates the mode of the counter 306 (FIG. 2). A signal 403 (WIR2) corresponds to the signal 403 in FIG. 2. An indication 404 (COUNTER) indicates the mode of the register 401 (FIG. 2). A signal 406 (WIR3) corresponds to the signal 406 in FIG. 2. An indication 404 (COUNTER) indicates the mode of the register 404 (FIG. 2). Signals WIR2 and WIR3 correspond to the signals WIR2 and WIR3 in FIG. 2. An indication 501 (REGISTER) indicates the mode of the register 501 (FIG. 2). A signal 604 (SEL DAR) corresponds to the signal 604 in FIG. 2. An indication 601 OUT indicates the output mode of the selecting circuit 601. Signals ENABLE SFR and ENABLE RAM are read signals provided by the PLA2 (FIG. 2) to request reading data from the internal data memory and the special register. Signals WRITE SFR and WRITE RAM are write signals provided by the PLA 602 (FIG. 2) to request writing data in the internal data memory and the special register. A signal WRPR1 is a signal to request writing data in the TPR1 register 20 (FIG. 1). An indication TPR1 indicates the mode of the temporary register 20. A signal WTPR2 is a signal to request writing data in the temporary register 21 (FIG. 1). An indication TPR2 indicates the mode of the temporary register 21. An indication ALU MODE indicates the mode of operation of the ALU 23 (FIG. 1). A signal ENABLE ALU is the output signal of the ALU 23 (FIG. 1). A signal WPSW is a signal to request writing data in the register 24 (flag status register) (FIG. 1). A signal CARRY indicates a carry provided when the eighth bit of the ALU 23 is specified by a main carry flag stored in the temporary register 24. A signal AC is an auxiliary flag stored in the temporary register 24 and specifying a carry in the fourth bit of the ALU 23. A signal ALU CARRY IN indicates a carry input to the ALU 23 (FIG. 1). A signal SELECT is a control signal to request consecutive execution, which is provided by the PLA 205 (FIG. 2) when an ADDC A, data address instruction is given to the instruction register 201 (FIG. 2). An indication OP MODE indicates the execution of a consecutive execution instruction.

The time chart of FIG. 4 shows, by way of example, the mode of an operation specified by an instruction mnemonic ADDC A, data address for repeating an ADDC A, data address instruction three times. Prior to the execution of the ADDC A, data address instruction, the consecutive execution frequency setting register 101 (FIG. 2) is set for "03H" to repeat the instruction three times. The register 301 (FIG. 2) specified by an instruction mnemonic A is set for 00H to specify an address "00H" in the internal data memory (RAM). The data address starts from an address "30H". Table 1 shows data mnemonics A and the status of data assigned to data addresses.

TABLE 1

| A | DATA | data address | DATA |
|---|------|--------------|------|
| 00H | 50H | 30H | 22H |
| 01H | 0AAH | 31H | 0BCH |
| 02H | 33H | 32H | 55H |

When an EROM signal is provide in the first M1-S1, an instruction code "35H" at the address ADDC A, data address is read from the program data memory (ROM) 4 (FIG. 1), the buses 7 to 0 becomes "00110101". When the signal WIR1 203 is provided, "35H" is stored in the instruction register 201. At the same time, the contents of the register 301 are transferred to the counter 306 and thereby the counter 306 becomes "00H". Since the signal SEL DAR 602 provided by the selecting circuit 601 remains "1" in M1-S1 through the middle of M1-S3, the contents of the counter 306 are provided to the PLA 604. In M1-S3, the data "50H" at the address 00H in the PLA 602 specified by the contents of the counter 306 are read and the status of the buses 7 to 0 becomes "0101000". At this moment, the PLA 205 provides the signal WTPR2 to store the data "50H" in the TPR2. When the gate 107 provides the signal 108 in the first M1-S3, the flip-flop 109 provides the signal B which has been retrieved at the trailing edge of M1-S3. Then, the register 110 retrieves consecutive execution frequency setting data 03H from the register 101. After the data 03H has been registered in the register 110, the output signal A of the gate 110 becomes "0" to inhibit the operation of the gates 107, 113, 202 and 310. In M1-S4, the EROM signal is provided to read the data "30H" of the second byte succeeding the instruction code from the ROM, and then the status of the buses 7 to 0 becomes 00110000. At this moment, the PLA 205 provides the signal WIR2 to store the data "30H" in the counter 401 and the register 501. Since the signal 604 (SEL DAR) applied to the selecting circuit 601 remains "0" during a period M1-S4 through the middle M2-S3, the contents of the register 501 are applied to the PLA 602. In M1-S5, the PLA 602 provides a read signal to read the data "22H" of address "30H" and the status of the buses 7 to 0 becomes "00100010". At this moment, the PLA 205 provides the signal WTPR1 to store the data "22H" in the temporary register 20. Since the ALU 23 is in the ADD instruction execution mode, the PLA 205 provides the ADD signal to add the contents of the temporary registers 20 and 21. Since the signal 604 (SEL DAR) applied to the selecting circuit 601 remains "1" during M2-S4 to the middle of the next M1-S3, the contents of the counter 306 are given to the PLA 602. In M2-S5, PLA 205 provides the signal ENABLE ALU, and then the ALU 23 provides the result of addition, namely, the addition of the contents of the temporary registers 20 and 21 and a carry (22H+50H+0=72H), and the status of the buses becomes "01110010". At this moment, the PLA 602 provides the write signal WRITE RAM to write data "72H" at an address "00H" in the register 306. On the other hand, the PLA 205 provides the write signal WPSW to write the main carry and the secondary carry in the register 24. Since the main carry and the secondary carry are not provided after the first cycle of ADD operation, the result of the first cycle of ADD operation is "0". In M2-S5, when the gate 112 provides the signal C, namely, a count clock, the contents of the register/counters 110, 306 and 401 are renewed at the trailing edge of M2-S5 to change the contents of the register/counter 110 from "03H" to "02H", those of the register/counter 306 from "00H" to "01H", and those of the register/counter 401 from "30H" to "31H". In M2-S6, since the signal A applied to the gate 113 is "0", the output signal D of the flip-flop 116 is "0". Consequently, the operation of the gates 402 and 403 is interrupted.

After M2-S6 has been completed, the second execution cycle of the instruction is started. In the second M1-S1, since the signal A applied to the gate 202 which generates a write signal specifying write operation in the instruction register 201 is "0", the write signal 203 specifying write operation in the instruction register 201 is not provided, and hence the instruction code "35H" stored in the instruction register 201 for the first M1-S1 remains in the instruction register 201. Accordingly, the instruction stored in the first execution cycle is executed. In M1-S3, the PLA 602 provides the signal ENABLE RAM specifying reading data from address "01H" in the register 306, and thereby the contents OAAH of the address "01H" is provided on the bus and the buses 7 to 0 becomes "10101010". At this moment, the PLA 205 provides the signal WTPR2 and the temporary register 21 stores "AAH". Although the PLA 205 provides the signal WIR2 in M1-S4, the signal 403 specifying writing data in the register 401 is not provided because the signal D applied to the gate 402 is "0". Accordingly, the contents of the register 401 are not changed. The signal WIR2 is used for specifying writing data in the register 501. Since the signal WIR3 applied to the selecting circuit 502 before the register 50 is "0", the register 501 stores the contents "31H" of the register 401.

In M1-S5, the PLA 602 provides the signal ENABLE SFR to read data from address "31H" specified by the contents of the register 501, and thereby the contents "0BCH" of the address "31H" is provided on the bus and the buses 7 to 0 becomes "10111100". At this moment, the PLA 205 provides the signal WTPR1 to store the data "0BCH" in the temporary register 20. Since the ALU is in the ADD instruction execution mode, the PLA 205 provides an ADD signal. In M2-S5, the PLA 205 provides the signal ENABLE ALU and thereby the result of addition of the data of the temporary registers 20 and 21, and the main carry, namely, (BC+AA+0=66), is provided on the bus, and the buses 7 to 0 becomes "01100110". At this moment, the PLA 602 provides the write signal WRITE RAM specifying writing data "66H" at address "01H" in the register 306. On the other hand, the PLA 205 provides the write signal WPSW to write the main carry and the secondary carry in the register 24. The main carry and the secondary carry provided after the second cycle of the addition instruction are "1". In M2-S5, the gate 112 provides signal C and the contents of the register/counters 110, 306 and 401 are renewed at the trailing edge of the M2-S5 to change the contents of the register/counters 110, 306 and 401 from "02H" to "01H", from "01H" to "02H", and from "31H" to "32H", respectively.

In M2-S6, since the data input gate 113 applies the signal A="0" to the flip-flop 116, the output signal of the flip-flop 116 continues being "0".

Upon the end of M2-S6, the third execution cycle is started. In the third M1-S1, since the signal D="0" is applied to the input AND gate 202 which generates a write signal specifying writing data in the instruction register 201, the write signal 203 is not provided. Accordingly, the instruction code "35H" stored in the instruction register 201 in M1-S1 of the first execution cycle remains in the instruction register 201, and hence the instruction stored in the first execution cycle is executed. In M1-S3, the PLA 602 provides the write signal ENABLE RAM specifying reading data from address "02H" specified by the register 306, and thereby the data "33H" of the address "02H" is provided on the bus and the buses 7 to 0 becomes "00110011". At this moment, the PLA 205 provides the signal WTPR2, and the temporary register 21 stores the data "33H".

In M1-S4, although the PLA 205 provides the signal WIR2, the signal 403 specifying writing data in the register 401 is not provided because the signal D applied to the input AND gate 402 is "0", and hence the contents of the register 401 are not changed. The signal WIR2 serves as a write signal for the register 501. Since the signal WIR3 applied to the selecting circuit 502 before the register 501 is "0", the contents "32H" of the register 401 are stored in the register 501. In M1-S5, the PLA 602 provides the signal ENABLE SFR specifying reading data from address "32H" specified by the contents of the register 501. Then, the contents "55H" of the address "32H" are provided on the bus, and the buses 7 to 0 becomes "0100101". At this moment, the PLA 205 provides the signal WTPR1 to store the data "55H" in the temporary register 20. Since the ALU is in the ADD instruction execution mode, the PLA 205 continues providing the signal ADD.

In M2-S5, the PLA 205 provides the signal ENABLE ALU, and thereby the addition (33H=55H++1) of the contents of the temporary registers 20 and 21, and the main carry is provided, and the buses 7 to 0 becomes "10001001". At this moment, the PLA 602 provides the write signal WRITE RAM specifying writing data in address "02H" specified by the register 306 to store "89H" at the address "02H". On the other hand, the PLA 205 provides the write signal WPSW to write the main carry and the secondary carry in the register 24. Since the main carry and the secondary carry are not provided at the end of the addition, both the carries are "0". In M2-S5, the signal C, namely, the count clock for the register/counters 110, 306 and 401, is provided to change the contents of the register/counters 110, 306 and 401 from "01H" to "00H", from "02H" to "03H", and from "32H" to "33H", respectively.

In M2-S6, the contents of the register/counter becomes "00H", and hence the output count completion signal A of the gate 111 changes from "0" to "1". The output count completion signal A = "1" is applied to the gate 113 and thereby the output signal D of the flip-flop 116 changes from "0" to "1". The three-cycle consecutive execution mode is ended at the end of M1-S6.

In the next M1-S1, since the signal A = "1" is applied to the gate 202 which provides a write signal to the instruction register 201, the gate 202 gives the signal 203 to the instruction register 201. Then, the instruction register 201 stores the next instruction.

Consecutive add operation for processing data shown in Table 2 by a conventional data processing system and by a data processing system according to the present invention will be compared hereinafter.

TABLE 2

| DAR | DATA | data address | DATA |
|---|---|---|---|
| Address 00H | 50H | Address 30H | 22H |
| Address 01H | 0AAH | Address 31H | 0BCH |
| Address 02H | 33H | Address 32H | 55H |

| Conventional Data Processing System | | |
|---|---|---|
| (1) | CLR C | Clear main carry |
| (2) | MOV A, 00 | Move data at 00H to A |
| (3) | ADDC A, 30 | Add A and data at 30H |
| (4) | MOV 00, A | Store result of addition at 00H |
| (5) | MOV A, 01 | Move data at 01H to A |
| (6) | ADDC A, 31 | Add A and data at 31H |
| (7) | MOV 01, A | Store result of addition at 01H |
| (8) | MOV A, 02 | Move data at 02H to A |
| (9) | ADDC A, 32 | Add A and data at 32H |
| (10) | MOV 02, A | Store result of addition at 02H |

| Data Processing System of the Present Invention | | |
|---|---|---|
| (1) | CLR C | Clear main carry |
| (2) | MOV DAR, #00 | Set DAR for data at 00H |
| (3) | MOVMOD, #03 | Set MOD for consecutive execution frequency data 03H |
| (4) | ADDC A, 30 | Execute A and instruction at 30H |

Thus, the conventional data processing system executes ten instructions, whereas the data processing system of the present invention executes only four instructions for the same purpose. The instruction decoder of the present invention has high ROM byte efficiency and operates at a high processing speed. Particularly, when a data transfer instruction (MOV data address 1, data address 2) is given, data can easily be transferred in blocks between optional areas, and hence a subroutine can easily be constructed without using any stack in an interruption process and an ordinary process.

As apparent from the foregoing description, according to the present invention, the operation of optional successive bytes can be carried out by counting the contents of a register for counting the number of cycles of instruction execution, a register for specifying data address, and a register specified by an instruction mnemonic A every time one cycle of instruction execution is completed.

Furthermore, registers 401 and 404 are used for repeatedly executing an instruction denoted by an instruction mnemonic ADDC data address 1, data address 2 for successive operand addresses, and the contents of the registers 401 and 404 are increased in count by "1" every time one cycle of the instruction is executed in a manner similar to that described with the registers 306 and 401 to form addresses continuously.

Thus, according to the present invention, in processing different data (operands) stored at different addresses, for example, in a data memory and a special register by repeating the same operation, the instruction of the operation is held in an instruction register and the different operand addresses are specified sequentially, so that the data is processed at a high processing speed and at a high byte efficiency.

Although the invention has been described in its preferred form with a certain degree of particularity, obvious many changes and variations are possible therein. It is therefore to be understood that the invention may be practiced otherwise than as specifically described herein without departing from the scope and spirit thereof.

What is claimed is:

1. An instruction decoder for a variable byte processor, the variable byte processor of the type which is processed by an instruction containing a first byte representing an operation code and a second byte representing an operand address, said instruction decoder comprising:

an instruction register for reading an instruction of the second byte, and connected to a data bus;

a first programmable logic array means, connected to said instruction register, for reading an instruction from said instruction register to control the general operation of the variable byte processor, and for providing a consecutive execution mode signal upon the reception of a consecutive execution instruction specifying a sequential repetition of a same instruction for operands stored at different internal operand addresses;

a consecutive instruction execution cycle monitoring means, connected to the data bus, which is set for a set value indicating a number of consecutive instruction execution cycles when the consecutive execution mode signal is provided, for counting the number of execution cycles every time an execution cycle is completed, and for providing a count completion signal upon a coincidence of the count of the execution cycles with the set value;

register/counters means, connected to the consecutive instruction execution cycle monitoring means, for increasing a count by one every time one execution cycle of the instruction is completed and for providing different addresses, respectively;

a second programmable logic array means for receiving outputs of said register/counters means and for specifying data at different operand addresses sequentially; and a read inhibiting means, connected to said instruction register, for inhibiting said instruction register from reading a new instruction from the data bus during a time period extending from a moment when said consecutive execution mode signal is provided to a moment when the count completion signal is provided.

2. An instruction decoder according to claim 1, wherein said consecutive instruction execution cycle monitoring means includes:

a register means for receiving the set value indicating the number of execution cycles from the data bus and for storing the set value;

a register/counter means, which is set for the set value stored in said register, for decreasing a count by one every time an execution cycle is completed; and a gate means for providing the count completion signal upon the reduction of the count of said register/counter is zero.

* * * * *